United States Patent [19]
Crow et al.

[11] Patent Number: 5,609,779
[45] Date of Patent: Mar. 11, 1997

[54] LASER DRILLING OF NON-CIRCULAR APERTURES

[75] Inventors: John M. Crow, Maineville, Ohio; James G. Kelley, California, Ky.; Todd J. Rockstroh, Maineville, Ohio

[73] Assignee: General Electric Company, Cincinnati, Ohio

[21] Appl. No.: 648,472

[22] Filed: May 15, 1996

[51] Int. Cl.$^6$ ........................................ B23K 26/08
[52] U.S. Cl. .......................... 219/121.71; 219/121.78
[58] Field of Search .................... 219/121.69, 121.7, 219/121.71, 121.72, 121.78, 121.8, 121.82, 121.85; 29/889.721

[56] References Cited

U.S. PATENT DOCUMENTS

| | | |
|---|---|---|
| 3,742,182 | 6/1973 | Saunders . |
| 4,169,976 | 10/1979 | Cirri ................................ 219/121.72 |
| 4,197,443 | 4/1980 | Sidenstick . |
| 4,653,983 | 3/1987 | Vehr . |
| 4,666,678 | 5/1987 | Lemelson . |
| 4,672,727 | 6/1987 | Field . |
| 4,676,719 | 6/1987 | Auxier et al. . |
| 4,726,735 | 2/1988 | Field et al. . |
| 4,737,613 | 4/1988 | Frye ............................... 219/121.72 |
| 4,762,464 | 8/1988 | Vertz et al. . |
| 4,808,785 | 2/1989 | Vertz et al. . |
| 4,873,414 | 10/1989 | Ma et al. ........................... 219/121.7 |
| 4,894,115 | 1/1990 | Eichelberger et al. ............ 219/121.69 |
| 5,026,964 | 6/1991 | Somers et al. . |
| 5,037,183 | 8/1991 | Gagosz et al. . |
| 5,043,553 | 8/1991 | Corfe et al. . |
| 5,066,357 | 11/1991 | Smyth Jr. et al. ................ 219/121.69 |
| 5,096,379 | 3/1992 | Stroud et al. . |
| 5,117,087 | 5/1992 | Baker et al. ...................... 219/121.71 |
| 5,216,808 | 6/1993 | Martus et al. . |
| 5,222,617 | 6/1993 | Gregory et al. . |
| 5,223,692 | 6/1993 | Lozier et al. . |
| 5,286,947 | 2/1994 | Clyde et al. . |
| 5,365,033 | 11/1994 | Williams . |
| 5,392,515 | 2/1995 | Auxier et al. . |
| 5,409,376 | 4/1995 | Murphy . |
| 5,418,345 | 5/1995 | Adamski . |
| 5,438,441 | 8/1995 | Rockstroh et al. . |

OTHER PUBLICATIONS

"Laser Drilling: Capabilities and Trends", by Shawn Murphy, Lasers & Applications, Mar. 1987, pp. 59–62.

"Parameters affecting hole geometry in laser drilling of nimonecs 75", by Yilbas B. S. Z. Yilbas, SPIE vol. 744, Lasers in Motion for Industrial Applications, 1987, pp. 87–91.

"Laser drilling with different pulse shapes", by Sven–Olov Roos, J. Appl. Phys., vol. 51, No. 9. Sep. 1980, pp. 5061–5063.

"Nd–YAG Laser Machining Technology for Cooling Passage Holes of High Temperature Gas Turbine Parts", by Kitao Takahara et al., Bulletin of GTSJ 1994/1995, pp. 34–39.

"A technical review of the laser drilling of aerospace materials", by C. Y. Yeo, S. C. Tam, Journal of Materials Processing Technology, 42, 1994, pp. 15–49.

Primary Examiner—Teresa J. Walberg
Assistant Examiner—Gregory L. Mills
Attorney, Agent, or Firm—Andrew C. Hess; Nathan D. Herkamp

[57] ABSTRACT

A method for forming an aperture in a component wall made of metal, the aperture having a diffuser which opens up and outward from a bottom of the diffuser to a first surface of the wall, the method includes the following steps: A) laser machining the wall with a laser which produces a laser beam having a pulse rate and power sufficient to vaporize the metal; B) firing and traversing the laser beam, preferably at an acute angle, across the surface to a predetermined first edge of the diffuser in a single pass starting at a centerline of the diffuser; and C) traversing the laser beam at an increasing rate of speed during the pass so that each beam pulse vaporizes the metal at a laser spot such that successive laser spots substantially overlap each other in decreasing amounts and the pulses nibble out the metal to form a continuous trench below the surface.

20 Claims, 4 Drawing Sheets

LASER DRILLING OF NON-CIRCULAR APERTURES

BACKGROUND OF THE INVENTION

FIELD OF THE INVENTION

The present invention relates generally to laser beam machining and, more specifically, to laser beam machining of non-circular cross-section apertures.

A gas turbine engine includes a compressor for compressing air, which is mixed with fuel and ignited for generating hot combustion gases in a combustor with energy being extracted from the gases in a turbine, disposed downstream of the combustor for powering the compressor and providing output power. Various components bound the hot combustion gases and, therefore, are typically cooled during operation for obtaining a useful life thereof. One conventional cooling arrangement includes film cooling holes which are typically inclined at an acute angle through the component for receiving a portion of the compressed air on one side thereof which passes through the holes to form a film of cooling air along the opposite side of the component which provides effective film cooling of the component during operation. Film cooling holes are typically found in combustion liners, turbine nozzle vanes and blades, turbine shrouds, and various shields requiring effective cooling. One particular type of a film cooling hole is a diffuser hole or a shaped hole. Typically, a diffuser hole or slot is formed with an exit area on the surface of the component to be cooled and the exit area is larger than its entrance area. Often a circular or otherwise shaped constant area feed hole is formed from the other surface of the component to the entrance area of the diffuser portion of the aperture. From the apertures, the cooling air is discharged along the cooled surface for creating a continuous cooling air film within the boundary for cooling the component.

Conventional processes exist for forming through holes in gas turbine engine components such as disclosed wherein holes may be drilled using an industrial laser or electrical discharge machining (EDM). In conventional laser drilling, a suitably powered laser beam is maintained at a desired location as the beam vaporizes metal until the through hole is completed. The laser, such as a ND:YAG laser, is typically operated at a suitable pulse rate with each pulse vaporizing a portion of the metal until the entire hole is completed.

However, methods to form these so-called blind apertures in the component for the improved film cooling diffuser apertures or slots, creates significant problems and costs. There is also a desire to form these noncircular cross-sectional diffuser portions of the aperture in an inexpensive manner while still being able to provide effective film cooling. The sidewalls and bottom of the slot should preferably be relatively smooth for aerodynamic reasons for efficient film cooling operation. The walls and bottom should also be sufficiently smooth to avoid undesirable stress concentrations for limiting maximum stress in the component during operation for providing a long life.

In the typical YAG pulse laser, each pulse has an amplitude and a finite duration, each typically having a plus or minus 5% variation in value. By integrating over time, the power of each pulse, the amount of energy in each pulse, may be determined which can have about a plus or minus 20% variation based on the worst case combination of the plus and minus 5% variations on pulse amplitude and duration. This substantial energy variation means that the amount of metal vaporized per pulse varies significantly from pulse to pulse, with the corresponding aperture being formed by consecutive pulses, varying significantly in configuration during the process. This significant pulse energy variation is typically not a major concern for drilling or laser cutting, since the objective is to form a through hole or cut, with the configuration of the in-process hole or cut being immaterial.

However, this substantial energy variation is quite significant for attempting to form blind non-circular holes or slots which do not pass completely through the metal component. Accordingly, attempting to use a laser in conventional practice to drill a blind hole and, then, continue the process for forming an elongated non-circular hole or blind slot, will result in a diffuser portion of the aperture having a substantial variation in width, depth and surface contour. The resulting jagged contour diffuser would be undesirable for aerodynamic and strength reasons. The jagged contour decreases the ability to form a substantially smooth and uniform cooling air film and the jagged bottom of the slot could undesirably decrease the effective strength of the base portion of the component below the slot bottom. Turbine film cooled components are typically relatively thin in overall thickness, which requires the accurate placement and depth of the blind aperture and diffuser hole or slot therein. If the remaining base material below the diffuser is too thin, the components may have undesirably low strength either reducing its useful life or requiring rejection of the component during the manufacturing process.

Alternatively, conventional EDM machining may be used for accurately forming the blind diffuser, followed in turn by forming the required through holes in the slot, again using conventional EDM machining or conventional laser drilling. These two processes would typically be performed in two separate and distinct steps utilizing refixturing the component in the same or different machines to form the differently configured blind slot and through holes in the component. Refixturing presents the additional problem of maintaining accurate alignment between the blind diffuser and the feed holes therein. Accordingly, the resulting manufacturing process would be relatively complex and costly since a typical component such as a turbine blade, turbine vane, or combustion liner has a substantial number of film cooling through holes, with the corresponding large number of blind apertures associated therewith and many blades and vanes are manufactured with these film cooling apertures.

SUMMARY OF THE INVENTION

A method for forming an aperture in a component wall made of metal, the aperture having a diffuser which opens up and outward from a bottom of the diffuser to a first surface of the wall, the method includes the following steps: A) laser machining the wall with a laser which produces a laser beam having a pulse rate and power sufficient to vaporize the metal; B) firing and traversing the laser beam, preferably at an acute angle across the surface to a predetermined first edge of the diffuser in a single pass starting at a centerline of the diffuser; and C) traversing the laser beam at an increasing rate of speed during the pass so that each beam pulse vaporizes the metal at a laser spot such that successive laser spots substantially overlap each other in decreasing amounts and the pulses nibble out the metal to form a continuous trench below the surface.

The traversing is preferably done linearly with the acute angle held constant during all of the traversals and starting from a centerline towards a predetermined first side edge of the diffuser and a second trench connecting to and collinear with the previously formed first trench is formed in the same manner by traversing the laser beam across the surface to an opposite predetermined second side edge of the diffuser to form one long continuous trench. Multiple adjacent long trenches are formed from one of the side edges to the opposite side edge by linearly traversing the laser beam and vaporizing the metal along parallel lines of spots so that adjacent lines of spots at least abut and preferably overlap. The adjacent long trenches may have different lengths. In one more particular embodiment, the adjacent trenches narrow in length in a direction normal to lengths of the trenches so as to form a substantially trapezoidal-shaped diffuser. The diffuser may be formed by using two or more sequences of the traversals wherein each of the traversals starts at about the centerline of the diffuser going outward towards one of the side edges.

According to one embodiment, a centering hole is first formed with at least one shot of the laser beam on the first surface of the wall in about a center of the diffuser. A more particular method uses the laser to drill a feed hole entirely through the wall such that when the entire aperture is finished the feed hole extends part way, such as about half way, into the wall from an opposite surface to the first surface of the wall and to the bottom of the diffuser. The method of the present invention may be used for forming a plurality of cooling apertures through a wall made of metal such as a cooled turbine airfoil of a blade or vane or a combustor liner.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

While the preferred embodiment of our invention has been described fully in order to explain its principles, it is understood that various modifications or alterations may be made to the preferred embodiment without departing from the scope of the invention as set forth in the appended claims.

Figure 1:
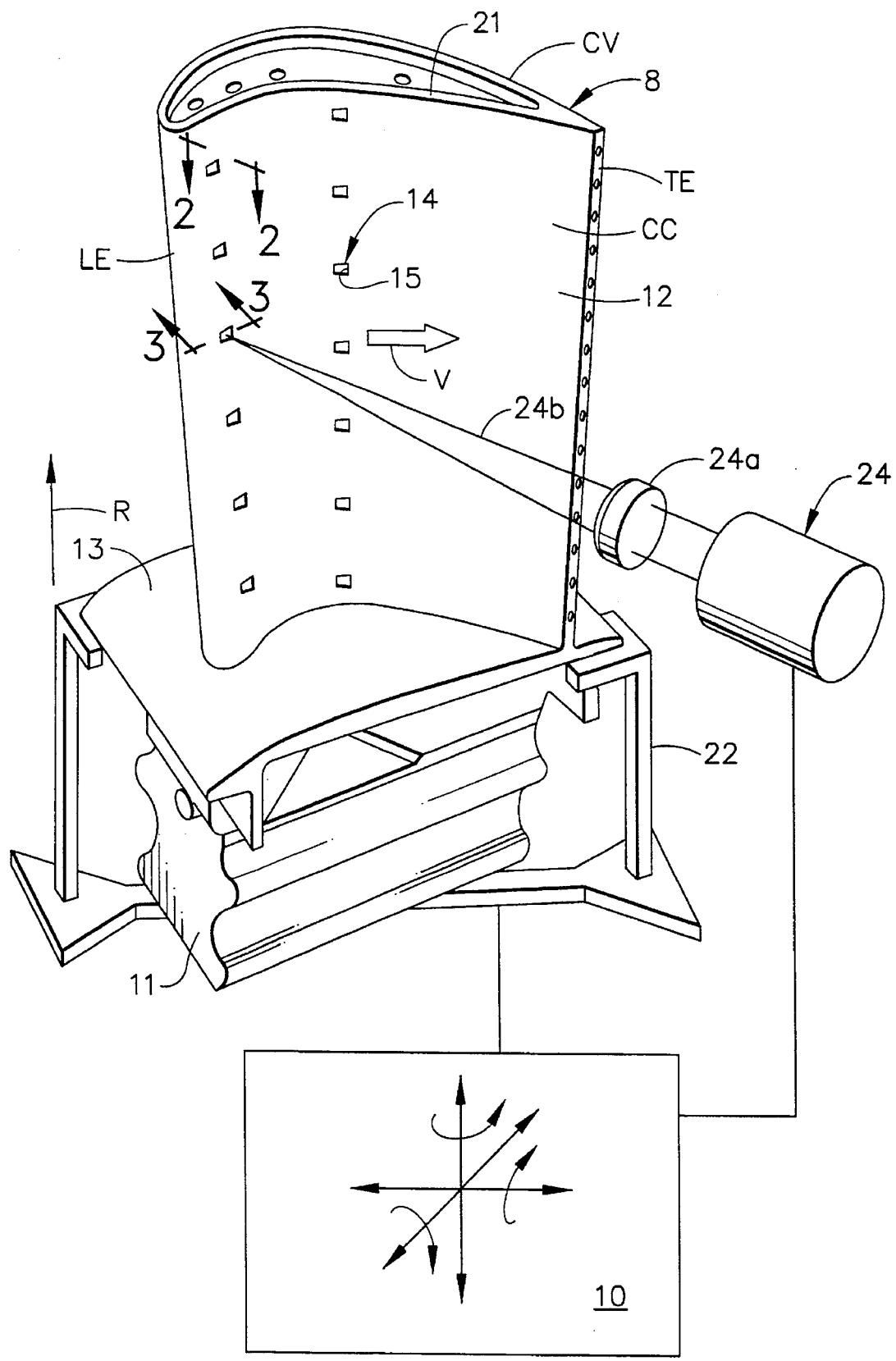
FIG. 1 is a schematic representation of an exemplary multi-axis machine supporting a component such as an exemplary hollow coolable gas turbine engine rotor blade in a corresponding fixture, and a laser beam for machining apertures such as slots and holes in the component in accordance with one embodiment of the present invention.

Illustrated schematically in FIG. 1 is a conventional multi-axis machine 10, which may be conventionally configured for providing three to eight axes of motion of a metal component, such as a gas turbine engine turbine rotor blade 8 having an airfoil 12 for example. In the exemplary embodiment illustrated, the blade 8 is integrally formed and the airfoil 12 is generally hollow and is integrally joined to a conventional dovetail 11 and a platform 13 therebetween from which the airfoil extends in a radial direction R. The airfoil 12 is conventionally configured with leading and trailing edges LE and TE, respectively, and a concave pressure side CC, and a convex suction side CV extending therebetween. The airfoil 12 is otherwise conventional except for a couple of rows of a plurality of laser formed longitudinally or radially spaced apart blind apertures 14 formed through an airfoil wall 21. Each of the apertures 14 having a generally downstream V facing non-circular cross-sectional diffuser 15 connected to and in fluid supply communication with a feed hole 16 which are disposed in flow communication with an inner cavity or channel 18 as more particularly shown in FIG. 2. The channel 18 is conventionally provided with film cooling air 20 during operation, as shown by the flow arrows illustrated in FIG. 1, which is discharged from the interior of the airfoil 12 through the several feed holes 16 to feed the diffuser 15 and form a radially continuous film of cooling air for cooling the airfoil 12 during operation against the heat of hot combustion gases which flow thereover during engine operation.

Although the aperture 14 and its film cooling diffuser 15 and the feed holes 16 supplying the cooling air 20 thereto are shown in the pressure surface of the airfoil 12, they may also be used on the suction surface thereof, or in any other hot component in a gas turbine engine or other structure subjected to a hot fluid such as the combustion gases for effecting film cooling of the components. For example, the diffuser 15 and feed hole 16 may be similarly configured in an otherwise conventional gas turbine engine combustion liner, turbine nozzle vane, turbine rotor shroud, or other components designed to use film cooling.

Figure 2:
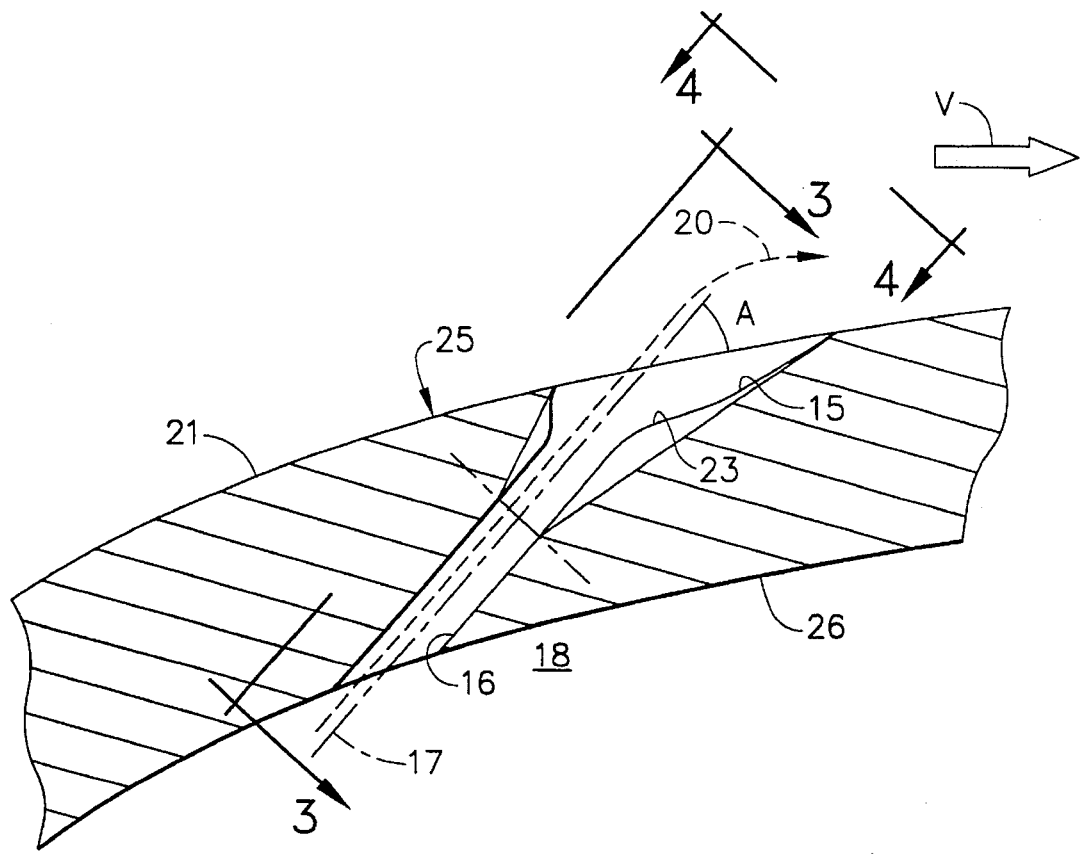
FIG. 2 is a sectional view of a portion of the airfoil of the turbine blade illustrated in FIG. 1 taken generally along line 2—2 through an exemplary cooling aperture formed therein.
Figure 3:
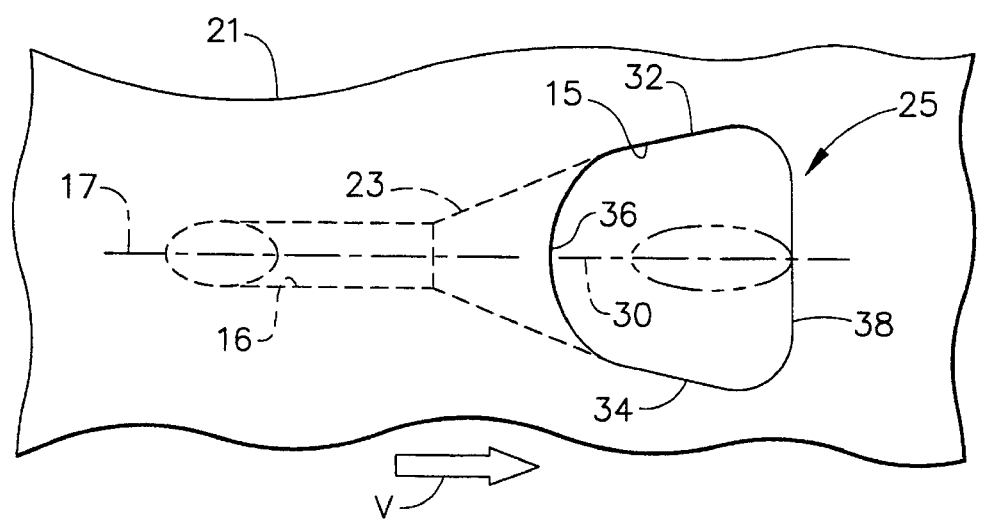
FIG. 3 is a sectional view through a portion of the airfoil slot illustrated in FIG. 1 and taken generally along line 3—3.

In accordance with the present invention, it is desired to form or machine the diffusers 15 and feed holes 16 in a relatively inexpensive, relatively fast, and relatively accurate process for reducing cost of manufacture since in a typical individual gas turbine engine component, there may be a great many diffusers 15 and a corresponding number of feed holes 16, and a substantial number of the individual components must be formed. FIGS. 2 and 3 illustrate, in more particularity, an exemplary one of the apertures 14 and the corresponding through feed holes 16 disposed in flow communication between the diffuser 15 and the interior channel 18 of the airfoil 12 in final form.

As shown schematically in FIG. 1, the blade 8 is suitably fixedly supported in a suitable fixture 22 shown schematically in the multi-axis machine 10 so that the blade may be moved in the various degrees of movement of the machine 10, which may be typically three to eight translational and rotational axes of movement. The fixture 22 may take any conventional form for fixedly holding the blade 8 during manufacturing. The machine 10 is in the form of a conventional computer numerical control (CNC) machine for providing accurate movement of the blade 8 during the manufacturing process.

The machine 10 further includes a conventional industrial laser 24 suitably fixedly joined relative thereto. The laser 24 itself includes various blades, such as a focusing lens 24a, and is conventional in configuration but operated in accordance with the present invention as further described hereinbelow. In accordance with the present invention, the laser 24 is operated in turn for both machining or forming the individual non-circular cross-sectional diffusers 15 and the corresponding feed holes 16 for each of the apertures 14 in a simple, inexpensive, and accurate manufacturing process. In the exemplary embodiment illustrated in FIG. 1, the laser 24 is preferably a conventional ND:YAG laser configured in accordance with the present invention for machining in turn the corresponding feed holes 16 and the diffuser 15 therein. The present invention may be used to form other types of non-circular cross-sectional apertures or excavations that may not use feed holes and/or have purposes and uses different from that of the exemplary diffuser 15.

Figure 9:
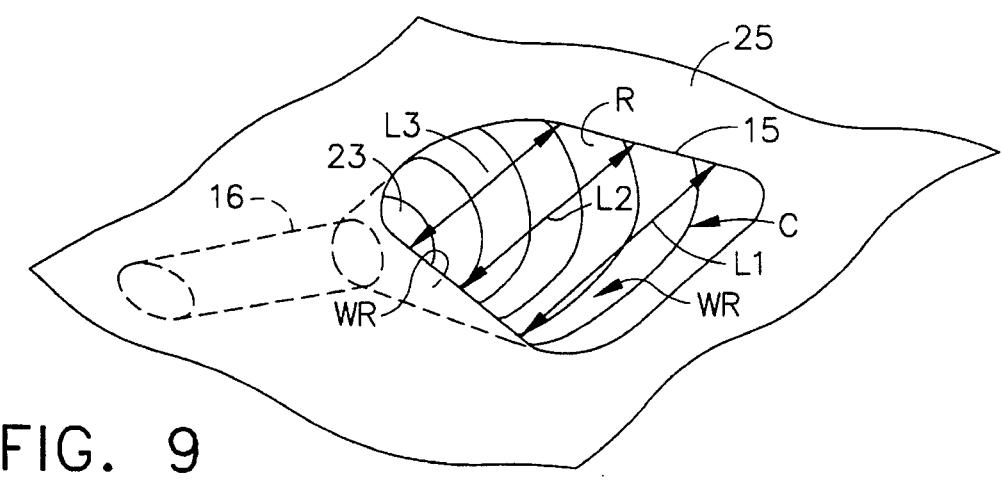
FIG. 9 is a perspective view illustrating the completed aperture having been made with two sequences of laser beam traversals illustrated in FIG. 4 and in accordance with the exemplary embodiment of the present invention.

The exemplary aperture 14 has a circular cross-section feed hole 16 with an axis 17 and a trapezoidal cross-section diffuser 15. The diffuser 15 has a centerline 30 which intersects the axis 17 and is parallel to first and second side edges 32 and 34, respectively, of the diffuser. Parallel forward and aft edges 36 and 38, respectively, of the diffuser 15 are perpendicular to the centerline 30 and are acutely angled relative to the first and second side edges 32 and 34, respectively. Note that the trapezoidal cross-sectional shape of the diffuser 15 is highly rounded at its corners C between sidewalls W and a wall ramp WR as is more particularly shown in FIG. 9. Each diffuser 15 opens up and outward from a bottom 23 of the diffuser to an outer surface 25 of the wall 21.

The invention provides a laser machining method to form the apertures 14 in the wall 21 which is made of metal. Preferably, the laser 24 is first used to produce a laser beam 24b to form the circular cross-section feed hole 16 by aiming the laser beam along the axis 17 and firing it until the feed hole is complete. The feed hole 16 also serves as a centering hole and so is preferably laser drilled first with the laser 24 to help properly shape the diffuser 15 during its machining. Next, the diffuser is formed by using the laser 24 to produce laser beam 24b having a pulse rate and power sufficient to vaporize the metal of the wall 21 in a nibbling action by firing and traversing the laser beam, preferably, at a constant acute angle A across the outer surface 25 to the predetermined first side edge 32 of the diffuser in a single pass starting at a centerline of the diffuser 15.

Figure 4:
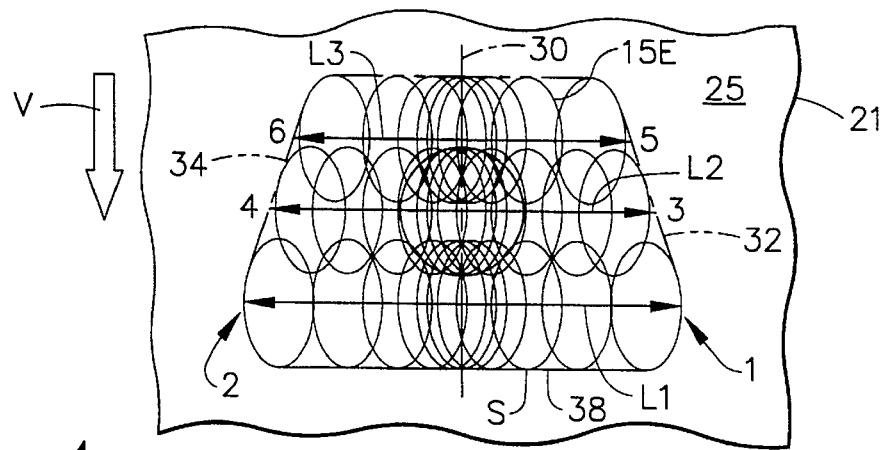
FIG. 4 is an elevational view of a diffuser portion of a cooling aperture being laser machined through the wall and taken along line 4—4 to illustrate laser formation of the non-circular diffuser portion therein followed in turn by laser drilling of the feed hole through the rest of the wall below the diffuser.
Figure 5:
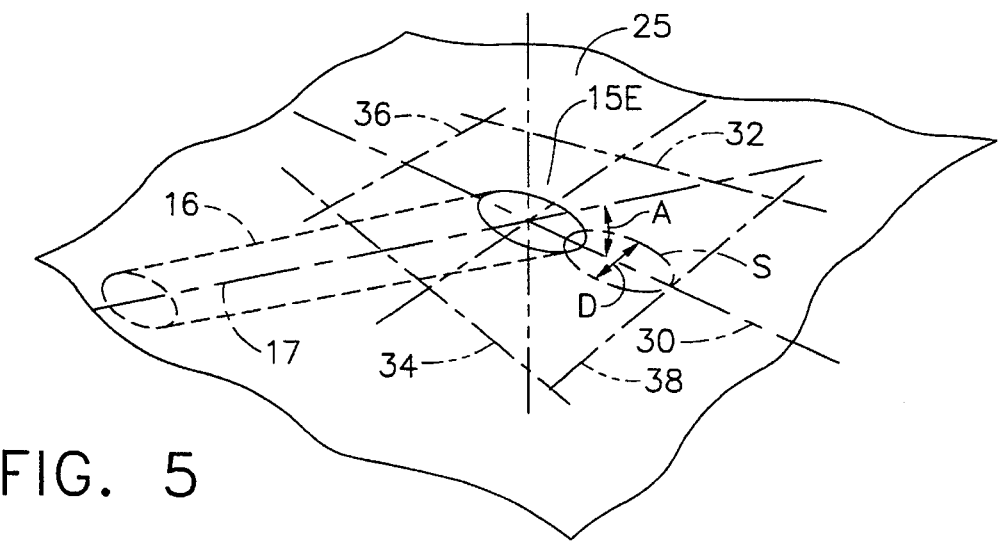
FIG. 5 is a perspective view illustrating the laser formation of the feed and centering hole in accordance with the exemplary embodiment of the present invention.
Figure 6:
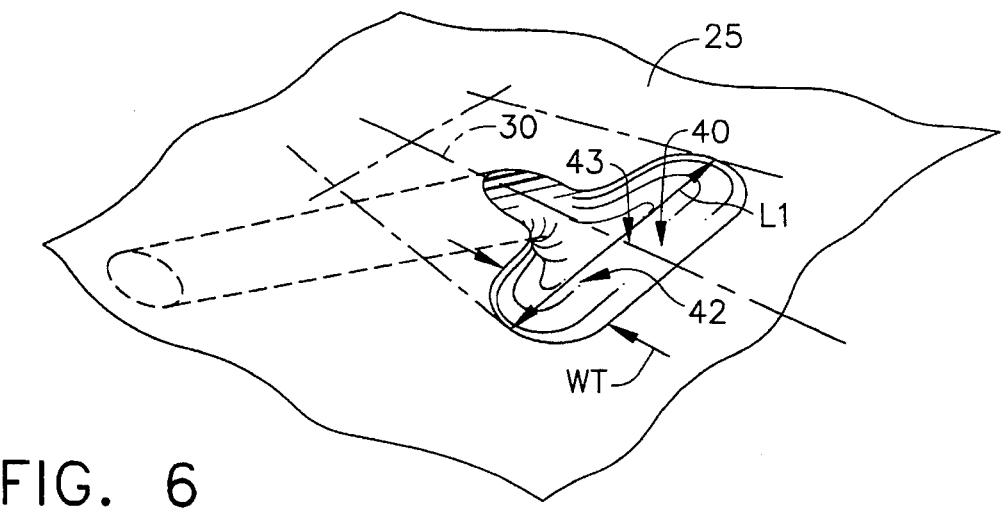
FIG. 6 is a perspective view illustrating the laser formation of a first trench of the diffuser in accordance with the exemplary embodiment of the present invention.

As illustrated in FIGS. 4 and 6, a first traversal 1, of the laser beam 24b is done from the centerline 30 to the first side edge 32. The first traversal 1 and all subsequent traversals are done at an increasing rate of speed during the traversal so that each beam pulse vaporizes the metal at a laser spot S, indicated by circles so marked, such that successive laser spots substantially overlap each other in decreasing amounts. This allows the pulses to nibble out the metal to form a first trench 40 having a width WT below the outer surface 25 and shapes the diffuser 15 to give provide a smooth integration at the corners C between the sidewalls W and the wall ramp WR. The traversing is preferably doze linearly and the acute angle A is preferably held constant with respect to an exit plane 15E of the diffuser 15 defined by the first and second side edges 32 and 34, respectively, and the forward and aft edges 36 and 38, respectively. The acute angle A is preferably at the same angle as that of the axis 17 of the centering and feed hole 16. The increasing rate of speed during the traversal may be accomplished by setting the feed rate of the multi-axis machine 10 at a constant setting and then simultaneously starting the machine and the laser pulsing so that the traversing begins to accelerate towards the setting value but stops and the laser ceases firing before actually reaching that value.

Figure 7:
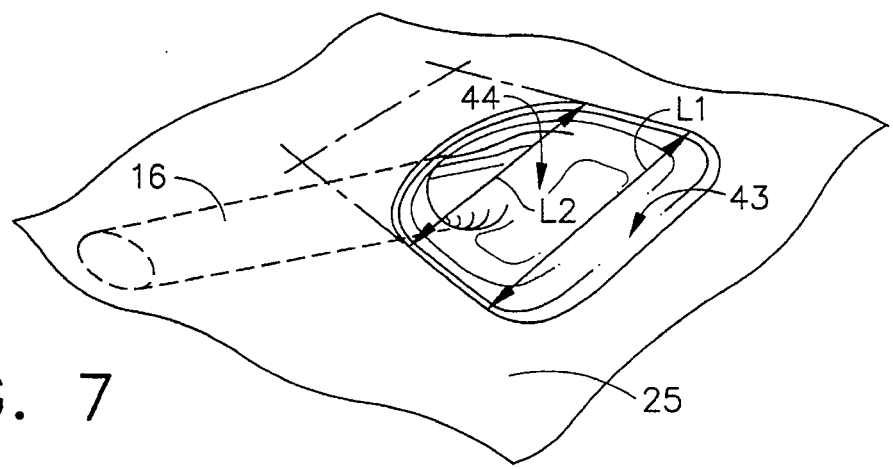
FIG. 7 is a perspective view illustrating the laser formation of an adjacent and overlapping second trench of the diffuser in accordance with the exemplary embodiment of the present invention.
Figure 8:
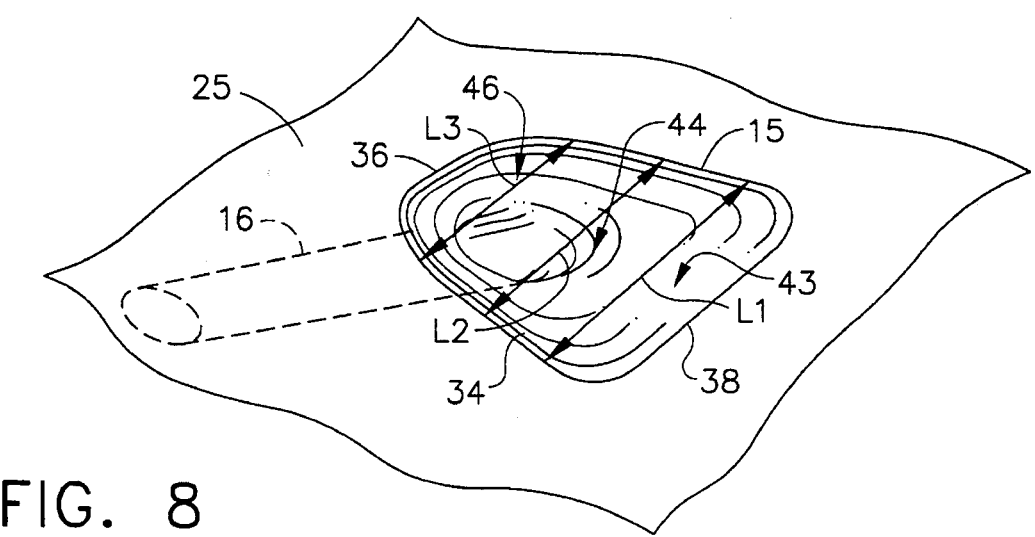
FIG. 8 is a perspective view illustrating the laser formation of an adjacent and overlapping third trench of the diffuser made with a first sequence of laser beam traversals illustrated in FIG. 4 and in accordance with the exemplary embodiment of the present invention.

A second trench 42 having the same width WT of and collinear with the previously formed first trench 40 is formed in a similar manner by a second traversal 2 of the laser beam 24b from the centerline 30 to the second side edge 34 to form a first long trench 43 having an average first length L1. Multiple, 3 in the exemplary embodiment herein, adjacent long trenches are formed between the first and second side edges 32 and 34, respectively by linearly traversing the laser beam and vaporizing the metal along parallel lines of spots S to form multiple adjacent long trenches so that adjacent lines of spots at least abut and preferably overlap. This is illustrated in FIGS. 4, 7 and 8, which indicate adjacent second and third overlapping long trenches, 44 and 46 respectively, having successively shorter average second and third lengths L2 and L3, respectively. The second long trench 44 is made by third and fourth traversals 3 and 4 and the third long trench 46 is made by firth and sixth traversals 5 and 6, respectively. The adjacent long trenches may have different lengths (L1–L3) as illustrated in the exemplary embodiment and adjacent trenches narrow in length in a direction normal to lengths of the trenches, i.e. from the forward edge 36 to the aft edge 38 so as to form a substantially trapezoidal cross-section shaped diffuser 15. The diffuser may be formed by using two or more sequences of the traversals 1–6, or any other number of traversals, above to form layers of nibbled out long trenches wherein each of the traversals starts at about the centerline of the diffuser going outward towards one of the side edges and the acute angle A is preferably held constant with respect to the exit plane 15E of the diffuser 15.

By using multiple sequences of traversals and suitably selecting the pulse rate and the feed rates, successive spots in turn do not overlap each other so as to be sufficiently spaced apart from each other for spreading apart the pulse energy at the spots. In a conventional drilling operation for example, successive pulses operate on the same spot, with the pulse energy thereof adding together for vaporizing the material at the common spot and drilling a hole through the material. This conventional drilling operation concentrates the laser energy and typically also enlarges the spot size greater than the nominal diameter of the pulse during operation due to the concentrated heat and its relatively large heat affected zone. This makes control of the trench difficult and causes jagged surfaces. In contrast, the present invention is operated to prevent the concentration of pulse energy at any one spot by rapidly traversing the laser beam 24b so that the pulse energy and corresponding spots S are spread apart laterally to distribute the energy. By forming the diffuser 15 using a series of passes of the laser beam 24b, with the spots S eventually overlapping each other between successive passes and not in individual passes, the laser beam pulse energy may be distributed along the diffuser and effectively averaged out thereacross. This effectively accommodates the large pulse energy variation discussed above which can be as large as about plus or minus 20% to nevertheless accurately form the diffuser 15. Since the pulse energy is being spread longitudinally along the diffuser 15, the resulting diameter of the trenches is substantially equal to the diameter D of the individual spots S and dimensions of diffuser can be accurately machined to provide substantially straight forward and aft edges 36 and 38, and first and second side edges 32 and 34, respectively. The increasing rate of speed during the traversal provides that the longitudinal sidewalls W of the diffuser 15 and the wall ramp WR formed, thereby, are relatively smooth in surface with relatively few irregularities therein for obtaining suitably smooth aerodynamic performance during operation of the diffuser in its intended film cooling environment.

An exemplary embodiment of the cooling aperture has the diameter D of the laser beam 24b and one of the corresponding spots S in the exemplary range of 7–15 mils. The laser 24 in the exemplary form of the ND:YAG laser may be operated with a conventional average power in the range of about 30–300 watts, with a preferred pulse rate in accordance with the present invention in the preferred range of about 10–50 Hz, and with a pulse duration in the conventional range of about 0.6–2.0 milliseconds (ms). The machine 10 may be conventionally operated for traversing the airfoil 12 relative to the stationary laser 24 so that the laser beam 24b is traversed at an accelerating rate by setting the machines feed rate in the preferred range of about 10–50 inches/minute in accordance with the present invention to form the diffuser at least two sequences of complete traversals.

A more particular method uses the laser 24 and laser beam 24b to drill the feed hole 16 entirely through the wall 21 such that when the entire aperture is finished the feed hole extends part way, such as about half way, into the wall from an inner surface 26 to the outer surface 25 of the wall and to the bottom of the diffuser 15. The method of the present invention may be used for forming a plurality of cooling apertures through a wall made of metal such as a cooled turbine airfoil of a blade or vane or a combustor liner.

While there have been described herein, what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A method for forming an aperture in a component wall made of metal, the aperture including a diffuser which opens up and outward from a bottom of the diffuser to a first surface of the wall, said method comprising the following steps:

A) laser machining the wall with a laser which produces a laser beam having a pulse rate and power sufficient to vaporize the metal;

B) firing and traversing the laser beam at an acute angle across the surface to a predetermined first edge of the diffuser in a single pass starting at a centerline of the diffuser; and C) traversing the laser beam at an increasing rate of speed during said pass so that each beam pulse vaporizes the metal at a laser spot such that successive laser spots substantially overlap each other in decreasing amounts and the pulses nibble out the metal to form a continuous trench below the surface.

2. A method according to claim 1 wherein said traversing is done linearly starting from a centerline of said diffuser.

3. A method according to claim 2 wherein a second trench is formed in the same manner by traversing the laser beam across the surface to an opposite predetermined second edge of the diffuser to form one long continuous trench.

4. A method according to claim 3 wherein multiple adjacent long trenches are formed from one of the edges to the opposite edge by linearly traversing the laser beam and vaporizing the metal along parallel lines of spots so that adjacent lines of spots at least abut.

5. A method according to claim 4 wherein adjacent lines of spots overlap.

6. A method according to claim 5 wherein the adjacent long trenches have different lengths.

7. A method according to claim 6 wherein the adjacent trenches narrow in length in a direction normal to lengths of the trenches so as to form a substantially trapezoidal-shaped diffuser.

8. A method according to claim 7 further comprising at least two sequences of said traversals wherein each of said traversals starts at about the centerline of the diffuser going outward towards one of the edges.

9. A method according to claim 8 wherein the acute angle is held constant during all of the traversals.

10. A method according to claim 8 wherein a centering hole is first formed with at least one shot of the laser beam on the first surface of the wall in about a center of the diffuser.

11. A method according to claim 10 further comprising a further step of using the laser to drill a feed hole into the diffuser such that the feed hole extends from a second surface opposite the first surface of the wall and to the bottom of the diffuser.

12. A method according to claim 11 wherein the acute angle is held constant during all of the traversals.

13. A method according to claim 11 wherein the feed hole is formed before the diffuser and the feed hole is used as the centering hole.

14. A method according to claim 13 wherein the feed hole is drilled by the laser beam at the same acute angle as during all of the traversals and wherein the acute angle is held constant during all of the traversals.

15. A method according to claim 14 wherein the feed hole extends about half way into the wall from the second surface of the wall and the diffuser extends about half way through the wall from the first surface of the wall.

16. A method for forming a plurality of cooling apertures through a wall made of metal and having outer and inner surfaces, each of the apertures including a diffuser having longitudinally paced apart forward and aft edges and transversely paced apart first and second side edges, and which opens up and outward from a bottom of the diffuser to the first surface of the component wall, said method comprising the following steps for each aperture:

A) laser machining the wall with a laser which produces a laser beam having a pulse rate and power to vaporize the metal;

B) laser drilling a feed and centering hole with the laser beam on the first surface of the wall in about a center of the diffuser;

C) traversing the laser beam latitudinally across the surface along the aft edge to the first side edge of the diffuser in a single pass starting at a longitudinally extending centerline of the diffuser and at an increasing rate of speed so that each beam pulse vaporizes the wall metal at a spot such that successive laser hit spots substantially overlap each other in decreasing amounts so that the pulses nibble out the metal to collectively form a continuous portion of a trench of decreasing depth below the surface; and D) traversing the laser beam latitudinally across the surface to the opposite second side edge of the diffuser in a single pass starting at the longitudinally extending centerline of the diffuser and at an increasing rate of speed so that each beam pulse vaporizes the metal at a spot such that successive laser hit spots substantially overlap each other in decreasing amounts so that the pulses nibble out the metal to collectively form a continuous remaining portion of the trench of decreasing depth below the surface.

17. A method according to claim 16 wherein multiple adjacent overlapping ones of the trenches are formed side by side starting from the previously formed trench to the forward edge to form a hollowed out diffuser.

18. A method according to claim 17 wherein more than one series of said traversals are made.

19. A method according to claim 18 wherein the at adjacent trenches have different lengths.

20. A method according to claim 19 wherein the adjacent trenches narrow in length in a direction normal to lengths of the trenches so as to form a substantially trapezoidal-shaped diffuser having parallel forward and aft edges and acutely angled side edges between them.

* * * * *